United States Patent
Aumond et al.

(10) Patent No.: US 6,661,004 B2
(45) Date of Patent: Dec. 9, 2003

(54) IMAGE DECONVOLUTION TECHNIQUES FOR PROBE SCANNING APPARATUS

(75) Inventors: Bernardo D. Aumond, Sao Paulo (BR); Kamal Youcef-Toumi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 346 days.

(21) Appl. No.: 09/789,992

(22) Filed: Feb. 21, 2001

(65) Prior Publication Data

US 2001/0038072 A1 Nov. 8, 2001

Related U.S. Application Data

(60) Provisional application No. 60/184,641, filed on Feb. 24, 2000.

(51) Int. Cl.[7] ............................. G01N 13/16; G01B 5/28
(52) U.S. Cl. ........................... 250/306; 250/307; 73/105
(58) Field of Search ................................ 250/307, 306; 73/105

(56) References Cited

U.S. PATENT DOCUMENTS

| | | | |
|---|---|---|---|
| 5,591,903 A | * | 1/1997 | Vesenka et al. ............... 73/105 |
| 5,665,905 A | | 9/1997 | Bartha et al. |
| 5,937,111 A | | 8/1999 | Yamada |
| 6,489,611 B1 | * | 12/2002 | Aumond et al. ............ 250/306 |

OTHER PUBLICATIONS

Markiewicz et al. "Atomic Force MicroscopeTip Deconvolution using Calibration Arrays", Rev. Sci. Instrum. 66 (5), May 1995, pp. 3186–3190.*

S. Alexander, et al., "Atomic–resolution atomic–force microscope implemented using an optical lever" J. Appl. Phys. 65 (1), Jan. 1989, pp. 164–167.

Bernardo D. Aumond, et al. "High Precision Stereo Profilometry Based on Atomic Force Microscopy" Mechanical Engineering Department Massachusetts Institute of Technology, Cambridge, MA 02139, 6 pages.

Bernardo D. Aumond, et al. "Experimental High Precision Profiliometry of High Aspect Ratio Samples" Mechanical Engineering Department Massachusetts Institute of Technology, Cambridge, MA 02139, 6 pages.

J.M. Bennett, et al. "Stylus profiling instrument for measuring statistical properties of smooth optical surfaces" May 15, 1981/vol. 20, No. 10/Applied Optics, pp. 1785–1800.

H. Bielefeldt, et al. "Reflection–scanning near–field optical microscopy and spectroscopy of opaque samples" Received Nov. 29, 1993 Accepted Mar. 22, 1994, pp. 1–3–108.

G. Binning, et al. "Surface Studies by Scanning Tunneling Microscopy" vol. 49, No. 1, Jul. 5, 1982 pp. 57–61.

G. Binning, et al. "Atomic Force Microscope" vol. 56, No. 9, Mar. 3, 1986, pp. 930–933.

Derek G. Chietwynd, et al. "High Precision Surface Profilometry: From Stylus to Stm" Chapter 14, pp. 272–299.

Samuel Dongmo, et al. "Blind restoration method of scanning tunneling and atomic force microscopy images" J. Vac. Sci. Technol. B 14(2), Mar./Apr. 1996, pp. 1552–1556.

C. Durkan, et al. "40 nm resolution in reflection–mode SNOM with $\lambda$ = 685 nm" 3 pages.

(List continued on next page.)

*Primary Examiner*—Nikita Wells
(74) *Attorney, Agent, or Firm*—Daly, Crowley & Mofford, LLP

(57) ABSTRACT

An apparatus and method are provided for processing the images obtained from an atomic force microscopy when profiling high aspect ratio features. A deconvolution technique for deconvolving the sample image includes the use of multiple images but does not require exact calibration of the scanning probe. In one embodiment, erosion and dilation techniques are used to obtain an undistorted image of the sample being measured. In another embodiment, Legendre transforms are used to obtain an undistorted image of the sample being measured. Also described is a technique for measuring the tip radius of the scanning probe.

22 Claims, 4 Drawing Sheets

OTHER PUBLICATIONS

W.P. Dyke, et al. "The Field Emitter: Fabrication, Electron Microscopy, and Electric Field Calculations" Journal of Applied Physics, vol. 24, May, 1953 pp. 570–575.

Eiichi Furukawa, et al. "Development of a Flexure–Hinged Translation Mechanism Driven by Two Piezoelectric Stacks" JSME International Journal, Series C, vol. 38, No. 4 1995, pp. 743–748.

Neil Goldfine, et al. "Near Surface Material Property Profiling for Determination of SCC Susceptibility" Fourth EPRI Balance–of–Plant Heat Exchanger NDE Symposiun, Jackson Hole, WY, Jun. 10–12, 1996, pp. 1–11.

Joseph E. Griffith, et al "Dimensional metrology with scanning probe microscopes" J. Appl. Phys. 74 (9), Nov. 1, 1993, pp. R83–R109.

Masakazu Hayashi, et al. "Scanning Tunneling Microscope to Reveal Surface Roughness" Abstract, pp. 97–102.

David Keller, et al. "Reconstruction of STM and AFM images distorted by finite–size tips" Surface Science 253 (1991) 353–364 North Holland, pp. 353–364.

P. Maivald, et al. "Using force modulation to image surface elasticities with the atomic force microscope" vol. 2, pp. 103–106 (1991).

Peter Markiewicz, et al. "Stimulation of atomic force microscope tip–sample/sample–tip" J. Vac. Sci. Technol. B 13(3), May/Jun. 1995, pp. 1115–1118.

Peter Markiewicz, et al. "Atomic force microscope tip deconvolution using calibration arrays" Rev. Sci. Instrum. 66 (5), May 1995, pp. 3186–3190.

Y. Martin, et al. "Atomic force microscope–force mapping and profiling on a sub 100–A scale" J. Appl. Phys. 01 (10) May 15, 1987 pp. 4723–4729.

G.L. Miller, et al. "A rocking beam electrostatic balance for the measurement of small forces" Rev. Sci. Instrum. 62 (3), Mar. 1991, pp. 705–709.

G.L. Miller, et al. "Resonant phase shift technique for the measurement of small changes in grounded capacitors" Rev. Sci. Instrum. 61 (4), Apr. 1990, pp. 1267–1272.

J.B. Pethica, et al. "Tip Surface Interactions in STM and AFM" Physica Scripta. vol. T19, 61 66. 1987, 6 pages.

Gopal Sarma, et al. "Restoration of scanning probe microscope images" 0–8186–2840–May 1992 pp. 282–289.

J.J. Saenz, et al. "Observation of magnetic forces by the atomic force microscope" J. Appl. Phys. 62 (10), Nov. 15, 1987, pp. 4293–4295.

J.F. Song, et al. "Stylus profiling at high resolution and low force" applied optics/vol. 30, No. 1/Jan. 1, 1991, pp. 42–50.

J.S. Villarrubia Morphological estimation of tip geometry for scanned probe microscopy; received May 25, 1994; accepted for publication Aug. 15, 1994, pp. 287–301.

J.S. Villarrubia "Scanned probe microscope tip characterization without calibrated tip characterizers" J. Vac. Sci. Technol. B. 14(2), Mar./Apr. 1996, 4 pages.

T. V. Vorburger "Methods for Characterizing Surface Topography" National Institute of Standards and Technology Gaithersburg, Maryland 29899, pp. 137–150.

K.L. Westra "Effect of tip shape on surface roughness measurement from atomic force microscopy images of thin films" J. Vac. Sci. Technol. B 13(2), Mar./Apr. 1995, pp. 344–350.

P.M. Williams, et al. "Blind reconstruction of scanning probe image data" J. Vac. Sci. Technol. B 14(2), Mar./Apr. 1996, pp. 1557–1562.

C.C. Williams, et al. "Scanning capacitance microscopy on a 25 nm scale" Appl. Phys. Lett. 55 (2), Jul. 10, 1989, pp. 203–205.

C.C. Williams, et al. "Scanning thermal profiler" Appl. Phys. Lett. 49 (23), Dec. 8, 1986, pp. 1587–1589.

Y. Yeo, et al. "precision Atomic Force Microscope Imaging" Department of Mechanical Engineering Massachusetts Institute of Technology Cambridge, MS 02139, 8 pages.

Yee Yeo "Image Processing for Precision Atomic force Microscopy" B.S., Purdue University (1998) 35 pages.

G.S. Pingali et al., "Estimation of Sample and Probe Tilts in Scanning Probe Microscopy", Proceeding of the Instrumentation and Measurement Technology Conference, 1993 New York, IEEE, pp. 327–332.

J.S. Villarrubia, "Morphological Estimation of Tip Geometry for Scanned Probe Microscopy", Surface Science, vol. 321, 1994, pp. 287–300.

D. Keller, "Reconstruction of STM and AFM Images Distorted by Finite–Size Tips", Surface Science, North–Holland Publishing Co., vol. 253, 1991, pp. 353–364.

B.D. Aumond et al., "Experimental High Precision Profilometry of High Aspect Ratio Samples", Systems, Man, and Cybernetics, 1998, IEEE International Conference on San Diego, CA, pp. 4435–4440.

GS Pingali et al., "Restoration of Scanning Probe Microscope Images", Applications of Computer Vision, Proceedings, 1992, pp. 282–289.

Copy of International Search Report of PCT/US01/05434.

* cited by examiner

IMAGE DECONVOLUTION TECHNIQUES FOR PROBE SCANNING APPARATUS

CROSS-REFERENCE TO RELATED APPLICATIONS

This application claims priority under 35 U.S.C. §119(e) to U.S. Provisional Patent Application No. 60/184,641 entitled "Image Deconvolution Techniques For Probe Scanning Apparatus" filed on Feb. 24, 2000, which is incorporated herein by reference in its entirety.

STATEMENTS REGARDING FEDERALLY SPONSORED RESEARCH

Not applicable.

FIELD OF THE INVENTION

This invention relates generally to profilometry and more particularly, to image deconvolution techniques for probe scanning devices.

BACKGROUND OF THE INVENTION

As is known in the art, a structure having one characteristic dimension (e.g. height) which is more pronounced than the others (e.g. width and length) is referred to as a high aspect ratio structure. Examples of these type of structures include probes of atomic force and scanning tunnelling microscopes, field emission probes, micro-indenters and Micro Electro-Mechanical systems (MEM's) structures. Other high aspect ratio structures are found in quantum magnetic media for high-density data storage, compact disk stampers, crystalline structures, blades and biological systems such as virus particles. Such high aspect ratio structures have typical heights on the order of tens of micrometers and tip radii in the range of tens of nanometers. Further, these structures may or may not be conductive.

Obtaining images of high aspect ratio structures poses certain challenges. In imaging such structures, it is sometimes desirable to image the side walls of the structure and to measure the radius of the tip of the structure in a non-destructive manner. Desired image resolutions can be on the order of 1 nm in the vertical direction (i.e. a direction which is normal to a measurement surface) and 10 nm in the lateral direction (i.e. a direction which is parallel to the measurement surface). Some profilometry methods are unable to provide such resolutions and thus such imaging criteria prevent the use of certain types of profilometry methods.

In one type of conventional stylus profilometer, a stylus having a sharp tip and coupled to a hinged arm is mechanically dragged along the sample surface. The deflection of the hinged stylus arm is measured and recorded as the surface profile. The use of a hinged stylus arm allows measurement of very rough surfaces, for example those with peak-to-peak heights greater than 1 mm. Probe-to-surface contact forces range from $10^{-3}$ N to $10^{-6}$ N. However, since the hinged stylus arm is partially supported by the stylus itself, physical rigidity limits the minimum stylus tip radius and hence the lateral resolution to about 0.1 mm.

In optical profilometry, many different optical phenomena (such as interference and internal reflection) can be utilized. The most popular technique is based on phase-measuring interferometry, in which a light beam reflecting off the sample surface is interfered with a phase-varied reference beam. The surface profile is deduced from the resulting fringe patterns. With a collimated light beam and a large photodetector array, the entire surface can be profiled simultaneously. This and other conventional optical profilometry methods are limited in lateral resolution by the minimum focussing spot size of about 0.5 μm (for visible light). In addition, measurement values are dependent upon the surface reflectivity of the material being profiled.

In the current state of the art, only scanning probe microscopes can meet a 10 nm lateral resolution requirement. In these microscopes, an atomically sharp (or nearly so) tip at a very close spacing to the sample surface is moved over the surface using a piezoactuator. One type of scanning probe microscope is the atomic force microscope (AFM), which measures the topography of a surface with a probe that has a very sharp tip. A probe assembly includes a cantilever beam from which the probe, or microstylus extends. The probe terminates at the probe tip having a typical tip radius of less than 0.1 μm. The probe typically has a length on the order of a couple of micrometers and the cantilever beam typically has a length between 100 μm and 200 μm.

In a contact mode atomic force microscope, the probe is moved relative to the surface of a sample and deflection of the cantilever is measured to provide a measure of the surface topography. More particularly, a laser beam is directed toward, and reflects off the back surface of the cantilever to impinge upon a sensor, such as a photodetector array. The electrical output signals of the photodetector array provide a topographical image of the sample surface and, further, provide feedback signals to a fine motion actuator, sometimes provided in the form of a piezoelectric actuator. In a constant force contact AFM, the fine motion actuator is responsive to the feedback signals for maintaining a substantially constant force between the probe tip and the sample, such as forces on the order of $10^{-8}$ N to $10^{-11}$ N.

Contact atomic force microscopy offers high lateral and vertical resolutions, such as less than 1 nm vertical resolution and less than 50 nm lateral resolution. Further, since the contact AFM relies on contact forces rather than on magnetic or electric surface effects, advantageously the contact AFM can be used to profile conductive and non-conductive samples. However, the maximum surface roughness that can be profiled is much less than that of conventional stylus profilometers which use a linear variable differential transducer (LVDT).

In the non-contact atomic force microscope, long range van der Waals forces are measured by vibrating the cantilever near its resonance frequency and detecting the change in the vibrational amplitude of a laser beam reflected off the cantilever due to a change in the force gradient caused by changes in the surface profile. The non-contact atomic force microscope offers non-invasive profiling. However, the technique has some disadvantages when compared to contact atomic force microscopy. First, van der Waals forces are hard-to-measure weak forces, rendering the microscope more susceptible to noise. Secondly, the probe tip must be maintained at a fixed height above the sample, typically on the order of a few nanometers, and the feedback control necessary to maintain this spacing must operate slowly to avoid crashing the probe tip on the sample. Thirdly, since the tip is always floating above the surface, the effective tip radius is increased and hence the achievable lateral resolution is decreased.

AFM was primarily developed for high-resolution 3-D imaging (profilometry) of atomically flat samples. In that case, the probe tip is scanned over the sample and only the apical region of the probe interacts with the profiled surface.

Therefore, AFM images will closely reproduce the topography regardless of distortions in the probe away from the apex. Accordingly, when stylus instruments are used in profilometry, the implicit assumption is that only the very apex of the stylus touches the surface at all points.

However, when structures having relatively high aspect ratio features are imaged, the AFM and stylus images can be quite different from the real topography. That is also the case when the dimensions of the sample are comparable to those of the employed probe (AFM probe or stylus). The reason for this deviation is that areas of the probe other than the apex (for instance, the probe sides) interact with the sample as well. The image distortion caused by the interaction of the probe with the surface is typically referred to as image convolution. These two conditions for significant convolution distortion—reduced sample dimensions and high aspect ratio occur frequently.

In many engineering fields, the characteristic dimensions of the samples or the features of interest lie well within the micrometer and sub-micrometer ranges. These fields include but are not limited to nanotechnology, micro-electromechanical systems (MEMS), semiconductor devices and storage media, micro-sensors, and blade fabrication. The investigated features could be photo-resist trenches in silicon wafers, memory pillars in quantum magnetic media devices, roughness in smooth optical surfaces, the radius of curvature of field emission probes and parts of micro-machines. Thus, images of such structures can be distorted by convolution errors.

The level of convolution is greatly dependent on the relative size and shape of the employed probe with respect to the sample. Different probes can interact with the sample generating different distorted images. Convolution seriously reduces metrology accuracy. The deviations in the measurement of radius of curvature of high aspect ratio samples is proportional to the radius of the probe. Therefore, samples with dimensions similar to those of the probe will generate images with close to a 100% radius measurement error. Width measurements taken from images of photo-resist trenches are embedded with deviations proportional to the square of the height of the probe (for nearly parabolic probes). Probe geometry and size can also affect texture parameter (e.g. roughness) measurements due to convolution.

In order to achieve high metrology accuracy in micrometer and sub-micrometer measurements, convolution effects must be minimized or eliminated from stylus and AFM images. Techniques that correct such effects are known as deconvolution methods. Deconvolution is necessary in applications in which the sample feature dimensions are in the same range as the size of the probe tip, therefore resulting in strong image convolution. Prior art deconvolution techniques include scanning a "standard sample" (i.e. a sample having a known surface shape) with a probe to provide a mean curve for the probe shape, an inner curve for the probe shape, and an outer curve for the probe shape, thereby characterising the probe shape. One problem with this approach, however, is that errors in the initial probe calibration propagate to all other measurements. Another problem with this approach is that the shape of the probe change and to problems over time because of physical changes in probe due to probe wear.

It is, therefore, desirable to provide a deconvolution technique that does not rely on probe characterization. It is also desirable to provide a deconvolution technique which is not degraded by probe wear.

SUMMARY OF THE INVENTION

In view of the above problems and limitations of existing AFM probe calibration and deconvolution techniques, the existence of convolution errors when measuring high aspect ratio features and when sample feature dimensions are in the same range as the size of the probe tip, and in accordance with the present invention, it has been recognized that multiple images can be used to reduce convolution errors in the measured image of a sample without the need for probe characterization. It would therefore be desirable to provide an apparatus and method to deconvolve a sample image using multiple measured images without having to accurately characterize the measuring probe or to recalibrate the probe as it wears.

In accordance with the present invention, an apparatus utilizing contact atomic force microscopy (AFM) includes a probe, a controller operative to move the probe into a first vantage point relative to the sample to produce a first image, and to move the probe into a second vantage point relative to the sample to produce a second image. The apparatus further includes a deconvolution processor which deconvolves the first image and the second image to produce an image of the sample. With such an arrangement, a sample can be measured by obtaining and processing multiple images without utilizing probe characterization or correcting for probe wear. The apparatus thus utilizes multiple images at different vantage points to remove the convolution errors caused by the probe and sample shape. Furthermore, since the apparatus does not require a conventional probe characterization process, changes in the shape of the probe due to wear from use or from other causes do not effect the accuracy of the convolution.

In accordance with a further aspect of the invention, a deconvolution method includes moving a probe in a first scanning pattern to generate a first image of the sample, changing said probe's vantage point, moving the probe in a second scanning pattern to generate a second image of the feature, and deconvolving the image of the sample using the first image and the second image. With this particular technique, a process for deconvolving an image without utilizing probe characterization is provided. The process is also unaffected by changes in probe shape due to wear or other causes. This technique is thus advantageous when using a microscope to measure relatively high aspect ratio samples. Furthermore, since the microscope images the sample at different angles, problems which arise due to regions where there is no contact between the sample and probe tip (e.g. so-called shadow zones) are reduced.

In a first embodiment, the deconvolution technique utilizes an iterative process. After generating multiple images of a sample from different vantage points, the process begins by generating two or more estimates of the probe shape using a first image. The estimates can be generated using a blind deconvolution method. Next using an erosion technique, each of the estimates of the probe shapes is used to obtain a corresponding estimate of the sample shape. Thus if two estimates of the probe shape are generated, then two estimates of the sample shape are obtained. At least two estimates of the probe shape are then combined to provide a new probe estimate. Similarly, at least two estimates of the sample shape are combined to provide a new sample shape estimate. The process of combining sample estimates (including newly computed sample estimates) to generate more sample estimates can be repeated any desired number of times. Similarly, the new sample shape estimates can be utilized to generate new probe shape estimates. The process of generating new probe shape estimates can also be repeated any desired number of times. In one embodiment, the above iterative process can be repeated until the changes in the newly computed sample shape and probe shape estimates are below a predetermined threshold when compared with the estimates from previous iteration. With such an arrangement an accurate estimate to the sample shape is obtained without the need for probe characterization. If additional images used, the fidelity of the estimated sample is increased.

In another embodiment, the deconvolution technique utilizes Legendre transforms in the processing of images to produce sample and probe measurements. After generating two images of a sample from different vantage points, the Legendre transform of the first and second image are obtained. These transforms are used in a system of equations that relate the transform of the sample with a first transform of the probe and the transform of the first image, the transform of the sample with a transform of the probe from the changed vantage point and the transform of the second image and relating the first transform of the probe, the transform of the probe from the changed vantage point and the angle between the first and second vantage point. After obtaining a Legendre transform of the first image and obtaining a Legendre transform of the second image, a parametric function is provided to describe the probe geometry and then by establishing how the upright and the rotated versions are geometrically related.

The parametric function provides a functional dependency between the probe transform in the first orientation and the probe transform from the second vantage point which allows a Legendre transform of the probe to be eliminated from the system of equations. Solving the system of equations by a least squares algorithm provides a Legendre transform of the sample. Finally, the sample is recovered from the Legendre transform of the sample. The probe geometry can also be recovered from the solution for the sample shape. With such an arrangement a partial but exact reconstruction of the sample shape is obtained without the need for probe characterization.

BRIEF DESCRIPTION OF THE DRAWINGS

The foregoing features of this invention, as well as the invention itself, may be more fully understood from the following description of the drawings in which.

DETAILED DESCRIPTION OF THE INVENTION

Figure 1:
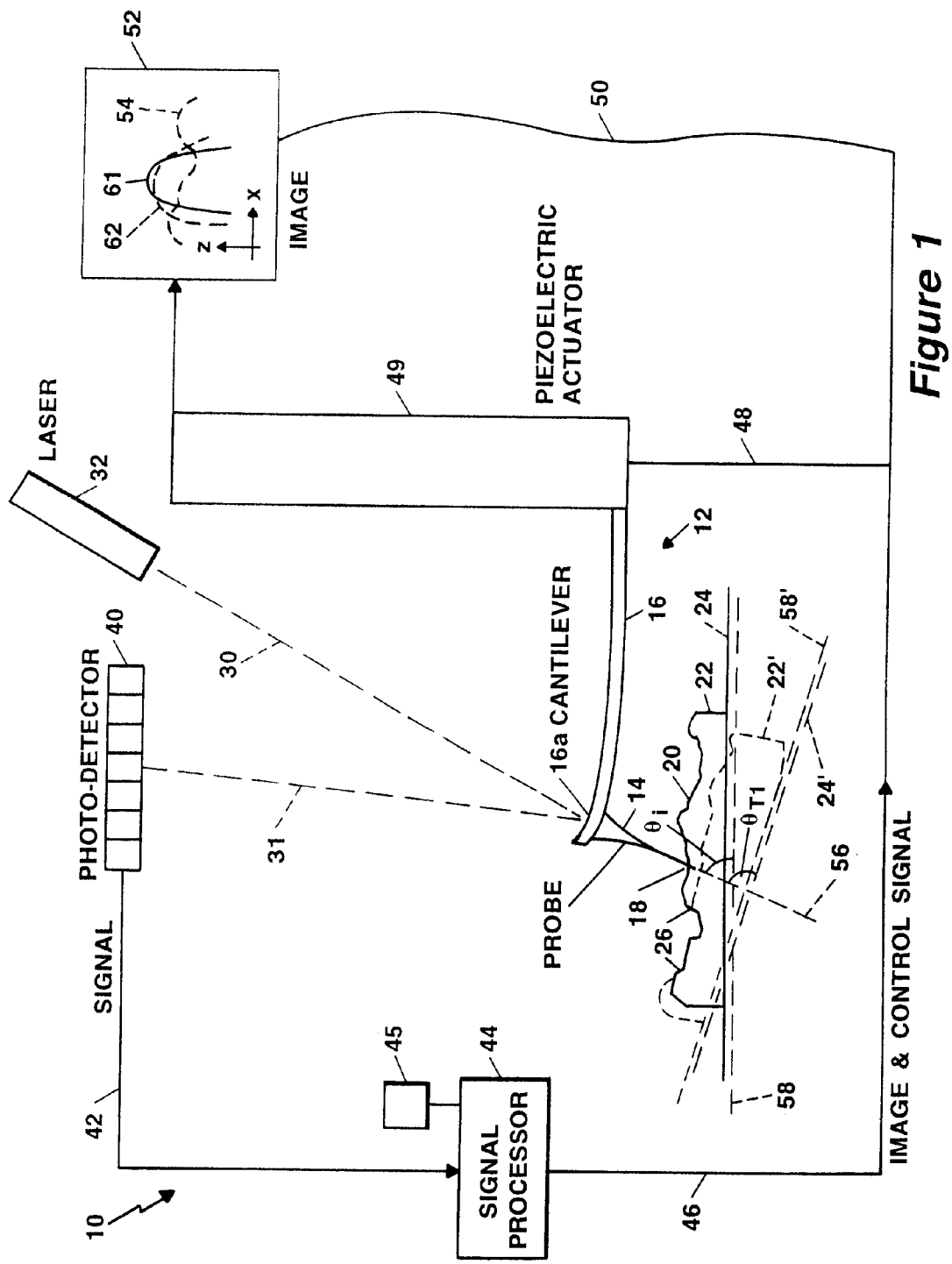
FIG. 1 shows a schematic diagram of an atomic force microscope.

Referring now to FIG. 1, a contact mode atomic force microscope (AFM) 10 includes a probe assembly 12 having a probe 14 mounted to the free end of a cantilever beam 16. The probe assembly 12 has a probe tip 18 adapted to contact a sample surface 20 of the sample 22 to be profiled. In this example, a sample 22 is disposed on a sample holder 24. It should be understood, however, that in other applications, sample 22 may be held by any fixture or surface. Any means of locating the sample 22 proximate the probe 14 may be used. A typical radius of the probe tip 18 is between 5 nm and 100 nm, a typical length of the probe 14 is on the order of 4.0 $\mu$m, and a typical length of the cantilever beam 16 is between 100 and 200 $\mu$m. It should be appreciated, however, that the present invention can be used in AFM's or other devices having probes and probe tips of any dimension.

In use, the probe assembly 12 and sample 22 are moved relative to one another, causing the probe tip 18 to move over the sample surface 20. Movement of the probe tip 18 over features including high aspect ratio structures 26 on the sample surface 20 causes the cantilever beam 16 to deflect. The deflection of the cantilever beam 16 is measured to provide a measure of the surface topography. More particularly, a laser beam 30 generated by a laser source 32 is directed towards, and reflects off a surface 16a of the cantilever beam 16. The reflected laser signal 31 impinges upon a sensor, or detector 40, which may, for example, be provided as a photodetector array. In response to the reflected laser signal 31, the detector 40 generates an output signal 42 which is provided to a signal processor 44.

Signal processor 44 processes the output signal 42 to provide processed signals 46, portions of which correspond to feed back control signals 48 and portions of which correspond to the topographical sample image signals 50. The control signals 48 are fed to a piezoelectric actuator 49 and the image signals 50 are fed to a display 52 on which the sample topographical image and other images can be displayed. A topographical sample view of the image 54 can be viewed on a display 52. The signal processor 44 can include a deconvolution processor 45. The display 52 is optional and the signal processor 44 operations can be automated.

Various types of signal processing may be performed, such as deconvolution, as described below in conjunction with FIG. 3 below. Further, the signal processor 44 may process the resulting image itself to perform certain sample measurements, such as measuring the radius of the tip of a feature of the sample. It should be appreciated the functions of the signal processor 44 and the deconvolution processor 45 can be provided by a separate processor, or by computer software instructions or groups of instructions executed on another processor which is part of the AFM. Such processing may be performed by a single processing apparatus which may, for example, be provided as part of microscope or measurement system such as that to be described below in conjunction with methods described in FIGS. 3 and 4. Alternatively, the processing steps of the signal processor 44 and the deconvolution processor 45 can be performed by functionally equivalent circuits such as a digital signal processor circuit or an application specific integrated circuit (ASIC).

Conventionally, AFM cantilever beams 16 are inclined with respect to the sample plane in order to reflect the laser beam 30 into the detector 40. However, if the probe 14 is inclined relative to sample holder 24, the probe tip 18 will touch one side of the high aspect ratio structure 26, but possibly not the other side. For this reason, preferably, the sample holder 24 is inclined to the same degree as the cantilever beam 16 so that the probe 14 and sample holder 24 are initially normal to one another. Ideally, the probe tip 18 should be normal to the sample surface 20 being measured.

In accordance with the present invention, the method for image deconvolution uses multiple imaging or stereo microscope imaging. The motivation for such an approach is drawn from the understanding that if the scanning is performed with the probe 14 always normal to the sample surface 20, convolution errors are minimized. Since this is not always practical given the available AFM configurations, one approximation to the ideal configuration is obtained by obtaining multiple images in which the angle between the probe tip 18 and the sample 22 is different. This may be accomplished, for example by utilizing different sample tilt angles. The images are then combined to form the deconvolved sample image.

For example, with the probe 14 and the sample holder 24 disposed in an initial position, the angle between an a central longitudinal axis 56 of the probe 14 and a plane 58 parallel with the plane of the sample holder 24 corresponds to an initial angle $\theta_i$. The initial angle $\theta_i$ is measured with respect to a central longitudinal axis 56 of probe 14 and an axis formed by the intersection of plane 58 and a plane normal to the cantilever beam 16 and containing axis 56. With such relative probe and sample positions at a first vantage point, a first image, image1 61 is obtained by scanning the probe tip 18 over the sample surface 20. A second image, image2 62 is obtained by tilting sample holder 24 causing the sample 22' (tilted sample 22) to be imaged by the probe 14 at relative angle 74 $_{T1}$. Portions of the image1 61 and image2 62 can be presented on the display 52 as topographic images of the sample. The sample images image1 61 and image2 62 are processed in accordance with techniques to be described below in conjunction with FIGS. 2–4.

Figures 2A, 2B, 2C:
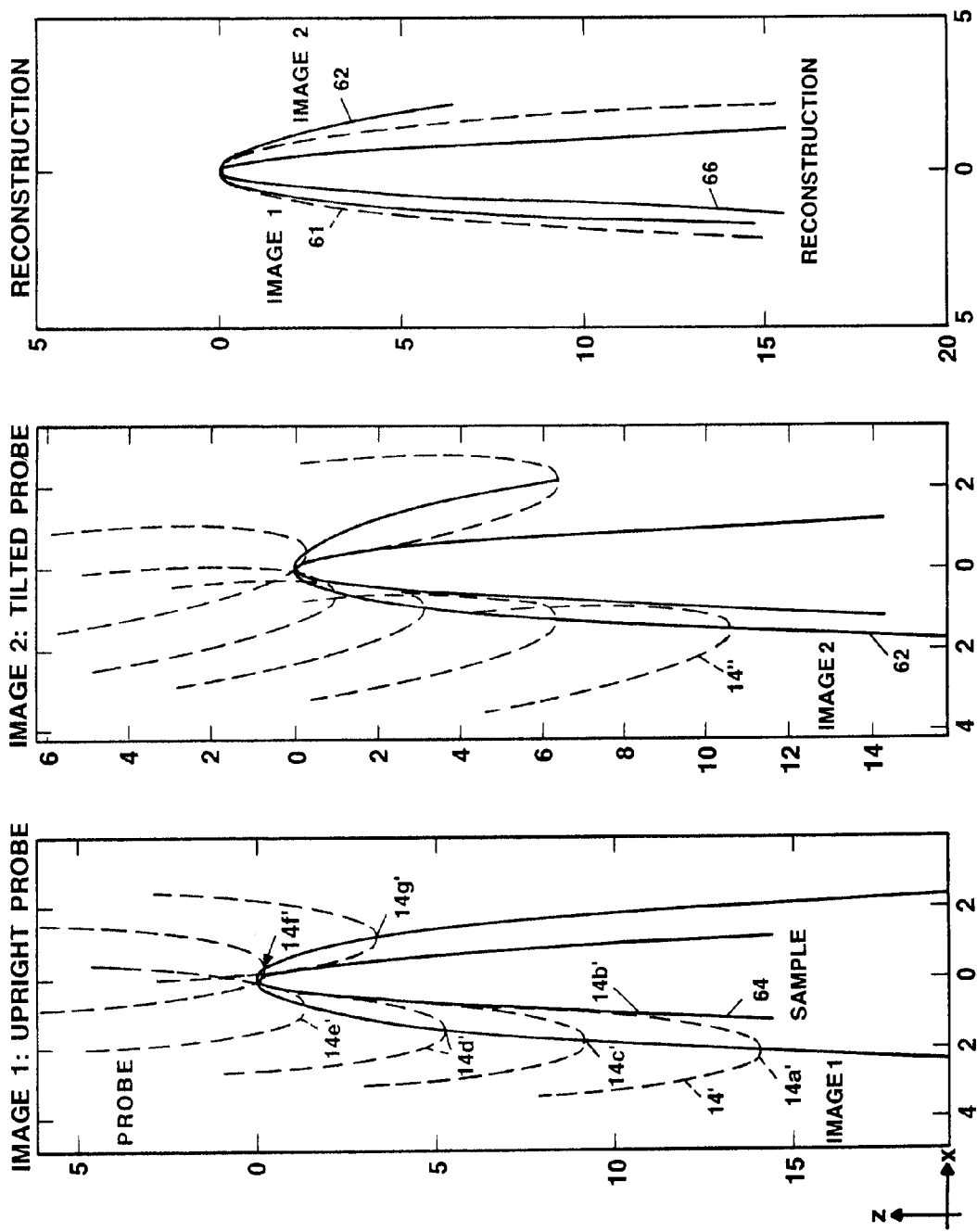
FIGS. 2A–2C demonstrate image deconvolution according to the present invention.

Now referring to FIGS. 2A–2C, images obtained from measuring the sample 22 (FIG. 1) in a single scan in the X direction are shown. The Z dimension represents heights and repetitive scans are in the X direction. Curve 64 represents an image of a portion of the sample 22 which would be generated in the absence of convolution errors. The portion of the sample 22 shown in FIG. 2A has a relatively high aspect ratio.

As illustrated in FIG. 2A, image1 61 is obtained by scanning the sample 22 with the probe 14 in a first position. In this particular example, the first position corresponds to the initial normal position as discussed above in conjunction with FIG. 1. Those of ordinary skill in the art should appreciate, however, that this need not be so. The first position can be any position as long as subsequent positions (probe vantage points) differ from it (i.e. as long as the relative angle between the probe and the sample holder are different). Curve probe1 14' represents a theoretical image of the probe 14 (FIG. 1) if the probe 14 could be perfectly characterized. When the probe 14 physically contacts the sample at point 14b' the point that appears in image1 61 is point 14a'. The convolution error is the difference between the true probe-sample contact point 14b' and the imaged point 14a'. As the probe 14 (FIG. 1) is scanned over the sample 22 (FIG. 1), additional imaged points 14e'–14g' are generated to form image1 61 with similar convolution errors. It should be appreciated that the number of points generated in the images depends upon the selected resolution of the microscope and the maximum resolution of the microscope scanner.

FIG. 2B shows a second image, image2 62, obtained by scanning the sample 22 (FIG. 1) with the probe 14 (FIG. 1) in a second position relative to the sample 22 (FIG. 1) which is different that that used to generate image1 61. In this particular example, image2 62 is generated when the sample holder 24 (FIG. 1) is tilted to an angle $\theta_{T1}$ relative to a central longitudinal axis 56 of probe 14 and an axis 58' formed by the tilted sample holder 24' on which the tilted sample 22' is disposed as shown in FIG. 1. It should be appreciated that rather than tilting the sample holder 24 (FIG. 1), the same result can be achieved by titling the probe 14 (FIG. 1). Alternatively, still the same result could be achieved by tilting both the probe 14 and the sample 22 by different angles to achieve the desired relative angle between the probe 14 and the sample 22. Image2 62 is generated as described above with respect to image1 61 and thus the image2 62 has similar convolution errors. As similarly described in FIG. 2A, curve probe2 14" represents a theoretical image of the probe 14 (FIG. 1) at relative angle $\theta_{T1}$ between the probe 14 and the tilted sample 22', if the probe 14 could be perfectly characterized.

FIG. 2C shows a reconstructed image 66 using the deconvolution techniques described below. The degree to which reconstructed image 66 approximates the true sample topography 64 depends upon a variety of factors including but not limited to the number of images processed, the deconvolution method, the extension of areas of the sample that were actually touched by the probe during scanning and the accuracy of any geometrical estimates of probe shape, including parametric geometric functions. Two deconvolution techniques are described below in embodiments which can be used to recover the true sample shape using multiple images. A first embodiment uses a minimum envelope method and a second embodiment uses a Legendre transformation-based reconstruction method.

In the first embodiment, a minimum envelope approach based on the concept of blind deconvolution is used to recover a deconvolved image. In the minimum envelope approach, two or more images are taken with different vantage points (obtained by changing the relative angle between the probe and sample as described above). The true sample profile for example curve 64 (FIG. 2A) is always bounded by the image sample, image1 61 (FIG. 2A). A blind deconvolution approach is used to find initial estimates for probe and sample topographies based on the measured first image, image1 61, and the second image, image2 62. The probe topography is bounded by the intersection of all estimates. The sample topography is bounded by the intersections of all sample estimates obtained with the blind deconvolution approach.

Figure 3:
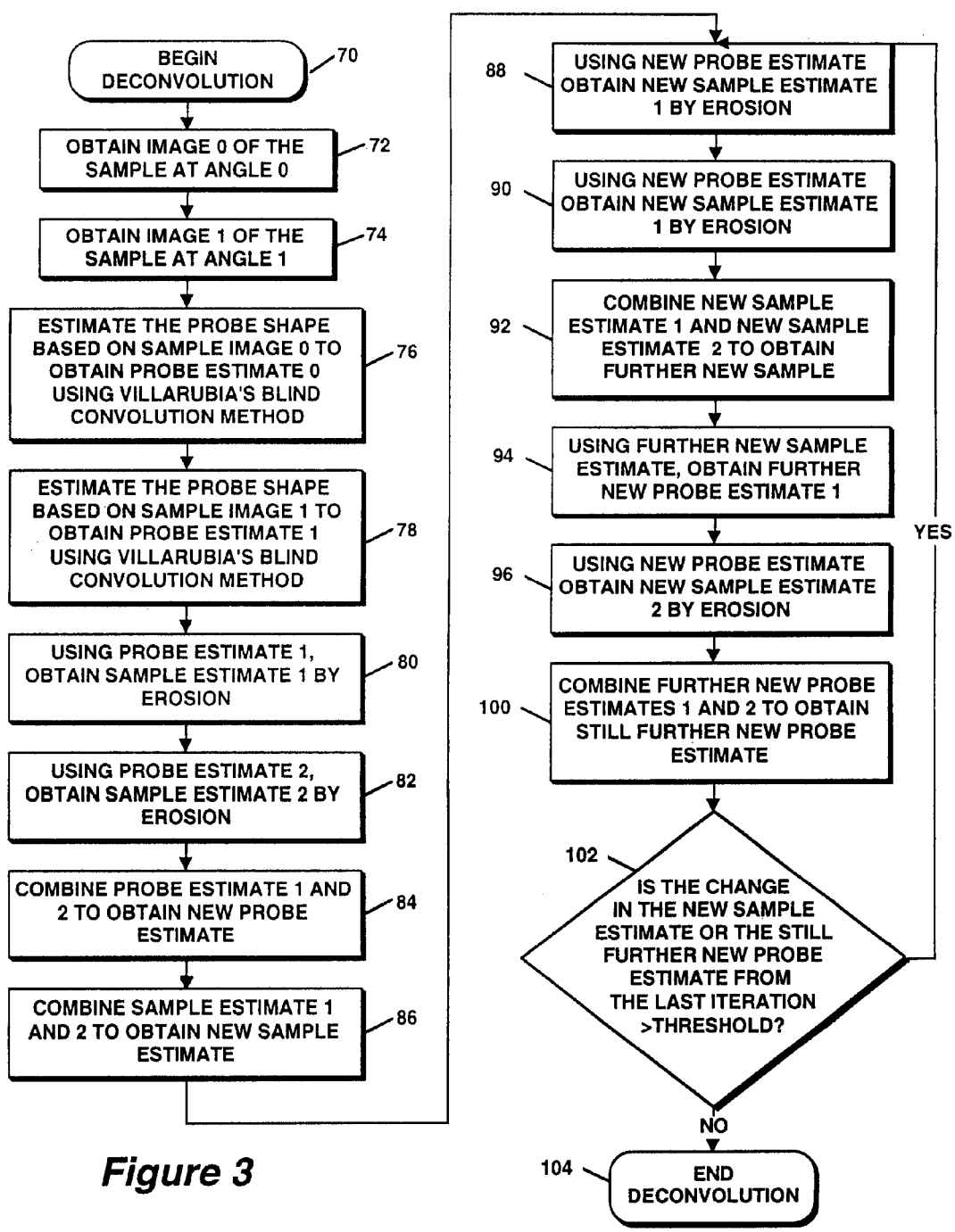
FIG. 3 is a flow diagram illustrating the erosion and dilation deconvolution technique according to an aspect of the invention.

Referring now to FIG. 3, the deconvolution process begins in step 70. In step 72 a first image of a sample, image1 61, is obtained with a first relative angle between the probe and the sample. In step 74, a second image of the sample, image2 62 is obtained with a different relative angle between the sample 22 and the probe 14 that is charged relative to the configuration used in step 72. Thus, the images, image1 61 and image2 62 are obtained from different vantage points. It should be appreciated that either the sample can be tilted, the probe can be tilted, or both the probe and sample can be tilted by different amounts to produce different angles between the probe and the sample.

In step 76, a first blind estimate of the probe EstP$_1$ based on the first image 61 is obtained using Villarubia's blind deconvolution method based on the probe shape 120 as is known in the art. The details of the blind estimation technique are explained in J. S. Villarubia, "Morphological Estimation of Tip Geometry for Scanned Probe Microscopy," Surf. Sci. 321, 287–300 (1994) and G. S. Pingali, R. Jain, "Restoration of Scanning Probe Microscope Images," IEEE Workshop on Applications of Computer Vision 282 (1992).

In step 78, a second blind estimate of the probe EstP$_2$ is obtained using Villarubia's blind deconvolution method based on image2 62. These blind estimates EstP$_1$ and EstP$_2$ are blunter than the real probe 14 and vary from the real shape, surface sample 20, because the images do not offer enough high aspect ratio features for a good estimation. The lack of high aspect ratio features leads to poor shape estimates.

Step 80 uses erosion and probe estimate $EstP_1$ to find new sample estimate, $EstS_1$ (estimate 1) from the first sample image and step 82 uses erosion and probe estimate $EstP_2$ to find new sample estimate $EstS_2$ (estimate 2) from the second sample image. The details of the erosion process are provided in J. S. Villarubia, "Morphological Estimation of Tip Geometry for Scanned Probe Microscopy," Surf. Sci. 321, 287–300 (1994) and G. S. Pingali, R. Jain, "Restoration of Scanning Probe Microscope Images," IEEE Workshop on Applications of Computer Vision 282 (1992).

In step 84, the two probe estimates are combined which results in the generation of a sharper estimate. If the estimate obtained from the upright sample image is $EstP_1$ and the estimate obtained from the tilted sample image is $EstP_2$ then the new estimate may be computed as $EstP = EstP_1 \cap EstP_2$. Since $P \subset EstP_1$ and that $P \subset EstP_2$ then it is guaranteed that $P \subset EstP_1 \cap EstP_2$. Additionally, since $(EstP_1 \cap EstP_2 \subseteq EstP_2$ and $(EstP_1 \cap EstP_2) \subset EstP_1$ the new estimate is sharper or more accurate than the previous estimates.

In step 86 the two estimates of the sample are combined to generate a better estimate of the sample surface topography. The new sample estimate is used to "sharpen" the probe estimate, which is then used to iteratively create better sample estimates.

Steps 88 to 102 iteratively repeat the process until no change in the estimation above a predetermined threshold is calculated.

In step 88, the new probe estimate from step 84 is used to obtain a new sample estimate 1 by erosion. In 90, the new probe estimate from step 84 is used to obtain a new sample estimate 2 by erosion.

In step 92, the two new sample estimates are combined to generate another more accurate new sample estimate. In order to do that, the sample estimate for the tilted case must be rotated by minus θ degrees rendering a rotated estimate denoted as $EstS_1^*$. The intersection is then found and will be the new estimate $EstS_{0new}$. These estimates are obtained by the erosion method. Since the estimate for the tilted case $EstS_1$ was obtained for the tilted sample, in order to combine the estimations, $EstS_1$ must be rotated back to render an estimate at 0 degrees ($EstS_1^*$).

As shown in steps 94, 96 the new sample estimates are used to obtain two new probe estimates.

In step 100, the two new Probe estimates $EStP_{2new}$ and $EStP_{1new}$ are combined, generating a new sharper probe estimate $EstP_{new}$.

Decision block 102 implements a loop in which the process of generating new probe and sample estimates in steps 88 to 102 are repeated. With the new probe estimate $EstP_{new}$, new sample estimates $EStS_{0new}$, $EstS_{new}$, can be generated by erosion. This is also described in B. D. Aumond and K. Youcef-Toumi, "Experimental High Precision Profilometry of High Aspect Ratio Samples," Proceedings of the 1998 IEEE International Conference on Systems, Man, and Cybernetics, San Diego, Calif. (November 1998), Y. Yeo, B. D. Aumond, and K. Youcef-Toumi, "Precision Atomic Force Microscope Imaging," Proceedings of the 2000 IEEE International Conference on Signal Processing, Beijing, China (August 2000), and B. D. Aumond, K. Youcef-Toumi, "High Precision Stereo Profilometry based on Atomic Force Microscopy Technology," Mechatronics 2000 Conference, Atlanta, Ga. (September 2000).

Thus, the new sample estimates are combined to generate a better estimate of the real surfaces for the upright and tilted measurements. This new surface estimate is in turn used to sharpen the probe estimates using both the first and second images (e.g. the upright sample image and tilted sample image). The sharpened probes estimates are combined generating a new probe estimate $EstP_{new}$.

In decision block 102, a test is performed to determine whether the further new sample estimate or the still further new probe estimate changed from the last iteration. If the change is lower than a predetermined threshold, then the deconvolution process is complete as shown in step 104. Otherwise the erosion process is repeated beginning at step 88. The sample combination steps 88, 90 and 92 and probe sharpening steps 94, 96, 100 will eventually render better estimates of probe geometry and sample topography. Thus, when compared to single image blind deconvolution, the results are improved.

It should be appreciated, the concepts and process of sample combination and probe sharpening are completely equivalent in two-dimensions (2-D) or three-dimensions (3-D).

In an alternate embodiment of the minimum envelope method, an underscanning technique (scanning the underside of the image with the probe reflected about the origin) as described in Y. Yeo, B. D. Aumond, and K. Youcef-Toumi, "Precision Atomic Force Microscope Imaging," Proceedings of the 2000 IEEE International Conference on Signal Processing, Beijing, China (August 2000).

Using the underscanning technique, the reflected probe geometry (the geometry of the probe is reflected horizontally and then vertically) scans of the underside of the image instead of the real sample. The reflected probe to simulate the scanning of the underside of the image very much in the same way that a probe scans a real sample. Record the reflected probe apex positions as it scans the image underside, very much in the same way one records the position of the real probe apex as it scans a real sample. The record of all those reflected probe apex positions renders a sample estimate, very much in the same way that the record of the real probe apex positions, as it scans a real sample, will render the image. This technique can be used to provide an initial probe estimate in steps 76 and 78 instead of using Villarubia's blind deconvolution method.

In a second embodiment, a Legendre based stereo profilometry can be used to deconvolve the sample image. The Legendre Transformation-based method relies on two images only. It makes use of the fact that when the sample 22 is tilted relative to the probe 14 by a certain angle (as described above in FIG. 1), the Legendre transform of its shape changes in a predictable way relatively to the Legendre transform of the sample in the original orientation. The Legendre transform of an AFM image is a linear combination of the Legendre transform of the probe shape and the Legendre transform of the sample shape $$L\{\text{sample}\} = L\{\text{probe1}\} + L\{\text{image1}\} \qquad \text{(equation 1)}$$

Figure 4:
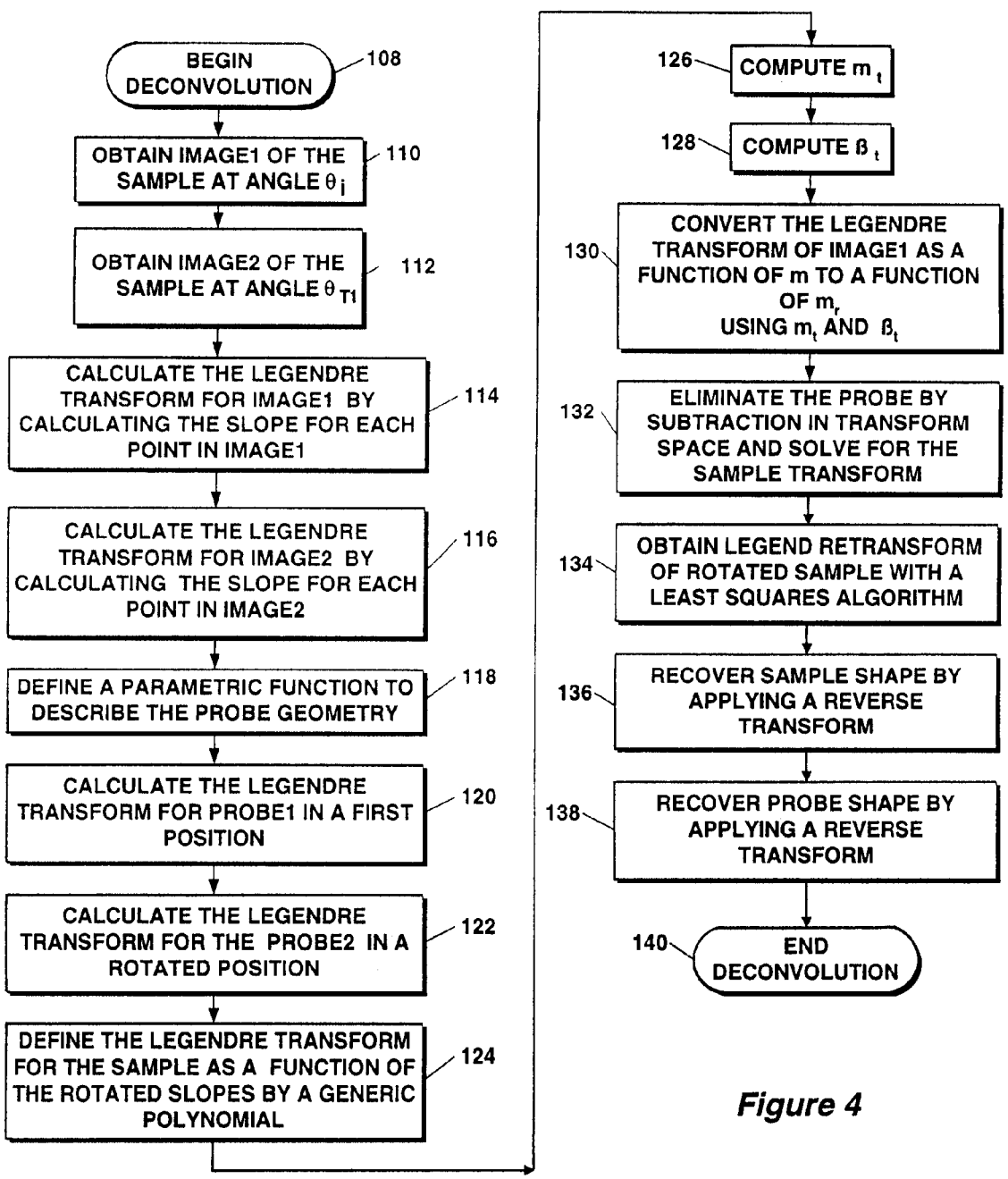
FIG. 4 is a flow diagram illustrating the Legendre transform deconvolution technique according to an aspect of the invention.

Now referring to FIG. 4, two images are obtained at steps 110 and 112 by scanning twice with different sample tilt angles ($\theta_i$ and $\theta_{T1}$ relative to the probe 14). In general overview, by using the constraint that relates the Legendre transforms of the probe in the two different orientations as expressed below in equation 2, and mathematically derived from equations 3–10, steps 114–138 solve a system of equations that renders the true sample denoted below as "sample" and probe shapes denoted below as "probe 1", "probe2" without a need for exact probe characterization. Image1 and image2 refer to the measured images image1 61 and image2 62 as shown in FIG. 2. Probe1 and probe2 refer to the curves probe1 14' and 14" as shown in FIG. 2 and are derived mathematically in the equations below.

$$L\{sample\}=L\{probe1\}+L\{image1\} \quad \text{(equation 2)}$$

$$L\{sample\}=L\{probe2\}+L\{image2\}$$

$$L\{probe1\}=f(L\{probe2\};\theta)\theta$$

Where θ is the angle of rotation ($\theta_{T1}-\theta_1$) between image2 obtained in step 112 and in step 114. It should be appreciated that some of these processing steps can occur in any order and that some of the steps can be combined mathematically.

At step 114, the Legendre Transform for image 1 is calculated by calculating the slope m at each point in image 1. The Legendre Transform is L=f(x)−m·x for a function y=f(x).

If the function is rotated by θ, the Legendre Transform undergoes a trigonometrical change. The new points (x',y') of the rotated function (x,y)can be obtained as follows:

$$x'=x\cos(\theta)-y\sin(\theta) \quad \text{(equation 3)}$$

$$y'=x\sin(\theta)+y\cos(\theta)$$

The new Legendre Transform of the rotated function (denoted $L_r$) can be written as:

$$L_r=y'-m_r\cdot x' \quad \text{(equation 4)}$$

in which $m_r$ corresponds to the slope of the rotated function.

Now substituting equation system 3 into equation 5 one can obtain:

$$L_r=x\sin(\theta)+y\cos(\theta)-m_r(x\cos(\theta)-y\sin(\theta)) \quad \text{(equation 5)}$$

Now, $m_r$, which is the slope of the rotated function, can be obtained as follows:

$$m=\tan(\alpha) \quad \text{(equation 6)}$$

$$m'=\tan(\theta)$$

$$m_r=\tan(\alpha+\theta)=(m\cos(\theta)+\sin(\theta))/(\cos(\theta)-m\sin(\theta))=(m+m')/(1-m\cdot m')$$

Where α is the inclination angle of the line that is tangent to the surface at x'.

Therefore, the rotated Legendre Transform is given by:

$$L_r=(x\sin(\theta)+y\cos(\theta))-((m+m')/(1-m\cdot m'))(x\cos(\theta)-y\sin(\theta)) \quad \text{(equation 7a)}$$

$$L_r(m_r)=(x\sin(\theta)+y\cos(\theta))-m_r(x\cos(\theta)-y\sin(\theta)) \quad \text{(equation 7b)}$$

At step 116, the Legendre Transform for the second image, image2 62, is computed by calculating the slope m at each point in image2.

The relationship between the Legendre Transforms L and $L_r$ is derived as follows:

$$L_r(m_r)=y'-m_r x' \text{ and } m_r=(m+m')/1-m\cdot m'$$

$$L_r=(x\sin(\theta)+y\cos(\theta))-((m+m')/(1-m\cdot m'))(x\cos(\theta)-y\sin(\theta))$$

$$L_r=(x\sin(\theta)+y\cos(\theta))-((m+\tan(\theta))/(1-m\cdot\tan(\theta)))(x\cos(\theta)-y\sin(\theta))$$

$$L_r=(x\sin(\theta)+y\cos(\theta))-((m\cos(\theta)+\sin(\theta))/(\cos(\theta)-m\sin(\theta)))(x\cos(\theta)-y\sin(\theta)) \quad \text{(equation 8)}$$

$$L_r=(1/(\cos(\theta)-m\sin(\theta)))(y\cdot\cos^2(\theta)-m\cdot y\cdot\cos(\theta)\sin(\theta)+x\cdot\cos(\theta)\sin(\theta)-(m\cdot x\cdot\sin^2(\theta)-(m\cdot x\cos^2(\theta)-m\cdot y\cdot\cos(\theta)\sin(\theta)+x\cdot\cos(\theta)\sin(\theta)-y\cdot\sin^2(\theta))) \quad \text{(equation 9)}$$

Simplifying equation 9 leads to equation 10. Equation 10 shows that given the angle of rotation θ and the original Legendre Transform L(m), the rotated version $L_r(m)$ can be obtained. This is a necessary condition for the principle established by equation 2 to work.

$$L_r=y-m\cdot x/(\cos(\theta)-m\cdot\sin(\theta))=L(m)/(\cos(\theta)-m\cdot\sin(\theta))$$

$$m_r=(m+m')/(1-m\cdot m')$$

$$m=(m_r-m')/(1+m_r\cdot m') \quad \text{(equation 10)}$$

At step 118 a parametric function is defined to describe the probe. The transformations are obtained for probe1 in a first position and for probe2 in a rotated position in steps 120 and 122.

At step 120 the Legendre transform for the probe in a first position (e.g. an upright position) is calculated. At step 122 for each pair ($L_0$, $M_0$) a valve ($L_0/(\cos(\theta)-m_0\cdot\sin(\theta)),m_0$) is computed. Next, the value $m_r$ is substituted for $m_o$ where $m_r$ corresponds to $m_r=(m_0+m')/(1-m_0\cdot m')$ is substituted for $m_0$ to obtain the pair ($L_0/\cos(\theta)-m_0\sin(\theta),m_r$). The new pair ($L_r,m_r$) is equal to ($L_0(m_0)/(\cos(\theta)-m_0\cdot\sin(\theta)),m_r$). Step 122 produces the Legendre transform for the rotated probe 14'.

Additionally if a curve has a Legendre Transform with value L at derivative m (this value of derivative happens at some point P along the curve), then the rotated curve will have a Legendre Transform of value $L_{trans}$ at the same point P which will now have a derivative $m_r=(m+\tan(\theta))/(1-m\cdot\tan(\theta))$.

$$L_{trans}(m)=L(m)/(\cos(\theta)-m\cdot\sin(\theta))$$

$$L_r(m_r)=L_{trans}(m_r-m'(/(1+m_r\cdot m') \quad \text{(equation 11)}$$

The deconvolution algorithm is derived as follows. For a certain sample with Legendre Transform S(m) and a probe with Legendre Transform P(m) an image can be generated. The Legendre Transform of image1 referred to as $I_1(m)$ should satisfy equation 1. That is:

$$S(m)=I_1(m)+P(m) \quad \text{(equation 12)}$$

At step 124, the Legendre Transform for the sample, S(m), is defined as a function of the rotated slopes by a parametric polynomial. Now, if the probe is rotated by θ, the second image 2 referred to as $I_2(m_r)$ should be described by:

$$S(m_r)=I_2(m_r)+P_r(m_r) \quad \text{(equation 13)}$$

Where $P_r(m_r)$ is the Legendre Transform of the rotated probe, probe2. Equation 11 shows that:

$$P_r(m_r)=P_{trans}(m_r-m')/(1+m_r\cdot m') \quad \text{(equation 14)}$$

Applying the transformation stated in equation 14 provides $P_{trans}((m_r-m')/(1+m_r\cdot m'))$ which is equivalent to $P_r(m_r)$ or $P(m_r-m')/(1+m_r\cdot m')/(\cos(\theta)-(m_r-m')/(1+m_r\cdot m'\sin(\theta)))$.

Therefore, the system described by equations 12, 13 and 14 provides the Legendre Transform of the sample S(m) with no need for probe characterization.

Because the Legendre Transform of f(x) is a function of the slope m $$LT[f(x)]\underline{\Delta}L(m)$$

$$\therefore f(x)=m(x)x+L(m(x))$$

The above leads to the true, deconvolved sample profile. In step 126, the equation $S(m)=I_1(m)+P(m)$ is used to obtain $S(m)/(\cos(\theta)-m\cdot\sin(\theta))=I_1(m)/(\cos(\theta)-m\cdot\sin(\theta))+P(m)/(\cos$ $(\theta)-m\cdot\sin(\theta))$ or $S_{trans}(m)=I_{1trans}(m)+P_{trans}(m)$ or $S_{trans}(m_r-m')/(1+m_r\cdot m'))=I_{1trans}(m_r\cdot m')/(1+m_r-m')+P_{trans}(m_r-m')/1+m_r m')$. Note that only the transform of the first image converted and then the probe is eliminated by subtraction in step 126.

From equation 14, $P_r(m_r)=P_{trans}(m_r-m'/1+m_r\cdot m')$. This provides two equations:

$$S_{trans}(m_r-m')/(1+m_r\cdot m'))=I_{1trans}(m_r-m')/(1+m_r\cdot m'))+P_{trans}(m_r-m')/(1+m_r-m'))$$

and $$S(m_r)-I_2(m_r)=P_r(m_r).$$

Finally in step 126, probe transform $P_r(m_r)$ can be eliminated by simple subtraction resulting in:

$$S(m_r) - \frac{S_{trans}m_r - m'}{1 + m_r \cdot m'} = I_2(mr) - I_{1trans}m_r - \frac{m'}{1 + m_r \cdot m'} \quad \text{Equation (15)}$$
$$= I_2(m_r) - I_{1r}(m_r).$$

At steps 128 and 130, intermediate calculations are performed to facilitate the elimination of the probe transform from equation 2 and allow the set of equations to be solved.

As step 132, the Legendre transform of the first image is converted to a function of $m_r$ from a function of m using $m_t$ and $B_t$.

At step 136, a least squares algorithm is used to obtain $S(m_r)$ from which the sample measurement can be calculated. Preferably the least squares solution is accomplished in Matlab (The Mathworks, Inc., Natick, Ma.). It should be appreciated that other commercial packages or software routines can provide the least squares solution.

At steps 138 and 140, both the sample shape and the probe shape are recovered.

The following example used to further describe the steps shown in FIG. 4. Returning to step 118, a parametric function is provided to describe the probe by defining a parametric function to describe the probe geometry and then by establishing how the first (e.g. upright) and the rotated versions are geometrically related. It should be appreciated that the method described here can be further adapted to work with a non-symmetric probe by allowing different left and right-hand segment functions to describe the probe.

At step 118, a parabolic function is chosen to describe the probe geometry. It should be appreciated that any parametric formula could be used. At step 118, the probe is described by parabolic function $p(x)=\frac{1}{2}R_p x^2$, and at step 120 its Legendre transform is calculated by $P(m)=-\frac{1}{2}R_p \cdot m^2$. Where m is the slope at each point.

The Legendre Transform of the rotated probe is given by $$\frac{P(m)}{\cos(\theta) - m\sin(\theta)}\bigg|_{m=\frac{m_r-m'}{1+m_r\cdot m'}}$$

That is:

$$P_r(m_r)=(-\tfrac{1}{2}R_p((m_r-m')/((1+m_r\cdot m')^2))/(\cos(\theta)-(m_r-m'/1+m_r\cdot m')\sin(\theta))=$$

$$-\tfrac{1}{2}(R_p(m_r-m')^2)/((1+m_r\cdot m')^2 \cos(\theta)-(m_r-m')(1+m_r\cdot m')\sin(\theta)).$$

$P_r(m_r)$ is obtained as a function of $P(m)$ and is identical to $P_r=y_r-m_r\cdot x_r$ where $y_r(x_r)$ is the function that describes the tilted probe with $m_r=dy_r/dx_r$.

At step 122, the Legendre Transform, $P_r(m_r)$, for the tilted probe is calculated. Applying the transformation described in equation 11 to $I_1(m)$ will render $$I_{1trans}(m_r-m'/1+m_r m')=I_{1r}(m_r).$$

At step 124, the following parametric polynomial is used to describe $S(m_r)$ as shown in equation 16.

$$S(m_r)=s_n m_r^n + s_{n-1} m_r^{n-1} + \ldots + s_2 m_r^2 + s_1 m_r + s_0. \quad \text{(equation 16)}$$

This polynomial is used to reconstruct the sample shape. It should be appreciated that the number of terms can be varied and that other functions can be used to describe $S(m_r)$ including sinusoidal, conical and exponential functions.

The Legendre Transform of the sample can be obtained using the parametric polynomial defined in step 124, and converting the Image transforms to the same transform space in steps 126–130. At step 126, for all the values $m_r$ contained in the domain of $I_2(m_r)-I_{1r}(m_r)$, $m_t$ is computed according to equation 17a.

$$m_t(m_r)=(m_r-m')/(1+m_r\cdot m'). \quad \text{(equation 17a)}$$

Given a tilted curve with derivative $m_r$ at some point P, the expression $m_t$ represents the derivative at the same point P when the curve is rotated $(-\theta)$ radians.

In step 128, $\beta_t$ is computed for all the values $m_r$ contained in the domain of $I_2(m_r)-I_{1r}(m_r)$, according to equation 17b.

$$\beta_t(m_r)=\cos(\theta)-m_t\sin(\theta)=\cos(\theta)-(m_r-m'/1+m_r\cdot m')\sin(\theta) \quad \text{(equation 17b)}$$

In step 130, the Legendre transform of image1 is converted from a function of m to a function of $m_r$ using $m_t$ and $\beta_t$.

At step 132, subtracting $I_{1r}(m_r)$ from $I_2(m_r)$ results in $S(m_r)-S_{trans}((m_r-m')/(1+m_r m'))$. Given that $S(m_r)-S_{trans}((m_r-m')/(1+m_r\cdot m'))=I_2(m_r)-I_{1r}(m_r)$ eliminates the probe from the system of equation 2.

In step 132, the subtraction of the converted first (e.g. upright) sample transform $S_{trans}$ from the rotated sample transform $S(m_r)$ can be described by:

$$S(m_r)-S_{trans}(m_r-m'/1+m_r\cdot m')=s_n m_r^n + s_{n-1}m_r^{n-1}+\ldots+s_2 m_r^2+s_1 m_r$$
$$+s_0-(s_n m_t^n + s_{n-1}m_t^{n-1}+\ldots+s_2 m_t^2+s_1 m_t+s_0)/\beta_t \quad \text{(equation 18)}$$

or $$s_n(m_r^n-m_t^n/\beta_t)+s_{n-1}(m_r^{n-1}-m_t^{n-1}/\beta_t)+\ldots+s_2(m_r^2-m_t^2/\beta_t)+$$
$$s_1(m_r-m_t/\beta_t)+s_0(1-1/\beta_t)=I_2(m_r)-I_{1r}(m_r) \quad \text{(equation 19)}$$

The system above can then be re-written as follows:

$$\begin{bmatrix} m_{r1}^n - m_{t1}^n/\beta_{t1} & m_{r1}^{n-1} - m_{t1}^{n-1}/\beta_{t1} & \cdots & m_{r1}^2 - m_{t1}^2/\beta_{t1} & m_{r1} - m_{t1}/\beta_{t1} & 1-1/\beta_{t1} \\ m_{r2}^n - m_{t2}^n/\beta_{t2} & m_{r2}^n - m_{t2}^n/\beta_{t2} & \cdots & m_{r2}^n - m_{t2}^n/\beta_{t2} & m_{r2}^n - m_{t2}^n/\beta_{t2} & 1-1/\beta_{t1} \\ \vdots & \vdots & \cdots & \vdots & \vdots & \vdots \\ m_{rk}^n - m_{tk}^n/\beta_{tk} & m_{rk}^n - m_{tk}^n/\beta_{tk} & \cdots & m_{rk}^n - m_{tk}^n/\beta_{tk} & m_{rk}^n - m_{tk}^n/\beta_{tk} & 1-1/\beta_{t1} \end{bmatrix} \cdot \begin{Bmatrix} s_n \\ \vdots \\ s_2 \\ s_1 \\ s_0 \end{Bmatrix} = \begin{Bmatrix} I_2(m_{r1})-I_{1r}(m_{r1}) \\ I_2(m_{r2})-I_{1r}(m_{r2}) \\ \vdots \\ I_2(m_{rk})-I_{1r}(m_{rk}) \end{Bmatrix} \quad \text{equation (20)}$$

Where $$m_{rl}^n$$

is the slope of point r1 ... rk in image two, and n is the power of the polynomial describing the Legendre transform of $S(m_r)$, the Legendre transform of the sample evaluated at $m_r$ where $m_r$ are the values of the slopes of image2 and $$m_{tl}^n$$

is a function of $$m_{rl}^n$$

At step 134, the over constrained system of equation 2 represented by equation 20 with out the probe is solved with a least square method to determine the coefficients $s_i$.

At step 136, the sample shape is reconstructed by applying the reverse transform of equation 21 as follows:

$$S(m_r) = y - m_r \cdot x$$
$$x = -dS(m_r)/dm_r = -s_n \cdot (n) \cdot m_r^{n-1} - s_{n-1} \cdot (n-1) \cdot m_r^{n-2} - \ldots - s_2 \cdot (2) \cdot m_r - s_1$$
$$y = S(m_r) + m_r \cdot x = S(m_r) - (dS(m_r)/dm_r) \cdot m_r \quad \text{(equation 21)}$$

The sample 22 shape can be recovered without any probe 14 characterization since the only information necessary is given by the two images and the rotation angle. Therefore, the sample 22 shape can be recovered by the Legendre Transform based method.

With this method, the system established in equation 2 is solved by eliminating the probe shape and solving for the sample shape according to equations 15 and 20. This is done by assuming a general parametric shape for the sample, as the polynomial description shown in equation 16.

It should be appreciated that the reconstruction could be accomplished by eliminating the sample shape from the equations and then assuming a general parametric shape for the probe, instead of the sample. A general parametric shape could be a sine wave of unknown frequency or amplitude, or a conic curve, or again, a polynomial. Instead of finding the shape of the sample first, one would find the probe shape. And then, by using equation 2, one can find the sample shape. An example of this method is described in B. D. Aumond, K. Youcef-Toumi, "High Precision Stereo Profilometry based on Atomic Force Microscopy Technology", Mechatronics 2000 Conference, Atlanta, Ga. (September 2000). The parametric function used to describe the probe could also be chosen to be a conic shape, for example:

$$y(m) = k\left(1 - \sqrt{1 - \alpha\left(\frac{m^2}{k^2 + \alpha m^2}\right)}\right)$$

Using the method as described in FIG. 4 only part of the sample can be recovered. The reason is that the probe recovery can only happen at the probe point that touched the surface during the two different orientation scans. The sample recovery can only happen at the sample surface 20, with points that were touched by that set of probe points. In order to enlarge the surface recovery area, additional images taken at different angles can be used to obtain a better reconstruction for most surfaces. Even though the reconstruction is partial, the reconstruction is exact at all points $S(m_r)$.

The least squares method offers a "best fit" to the points $S(m_r)$. With a high order polynomial, the best fit curve will go through all points $S(m_r)$ but in between those points, the curve will have some error representing $S(m_r)$. With a low order polynomial, the curve may not exactly go through the points $S(m_r)$ but will be a smoother curve which may provide more desirable results.

If for example a polynomial of order two (a parabola) is used and $S(m_r)$ has a step like shape, the resulting fit will probably not be optimal. But if a polynomial of order 20 is used, it will better fit $S(m_r)$. If nothing is known about $S(m_r)$, different order polynomials can be tested to find the best fit. The selection of the function to represent $S(m_r)$ will have a corresponding effect on the reconstructed shape.

Additionally at step 138, given that $S(m_r)$ and $I_2(m_r)$ are known, the probe $P_r(m_r)$ can be reconstructed by solving the linear equation $S(m_r) = I_2(m_r) + P_r(m_r)$. Therefore, the technique can be used for probe characterization as well.

It is also important to note that the image recovery is not equivalent to selecting the minimum area below the two superimposed image curves (e.g. curves image1 61 and image2 62 in FIG. 2B). Selecting the minimum area below the two image curves offers only an estimate of the surface. The Legendre Transform based method is exact.

The techniques and apparatus of the present invention thus permit the successful profiling of high aspect ratio nanoscopic features using an atomic force microscope operated in the contact mode. The difficulties of using an AFM with these types of structures stem from the fact that AFM technology was developed for mostly flat samples or features with small relative heights and/or smooth topography. While measurements of line width of micro trenches and micro steps in the semiconductor industry pushed the technology further, high aspect ratio structures present a new challenge. The present invention addresses and overcomes these challenges, including new deconvolution techniques based on the use of multiple images of the sample without a continuing requirement for exact probe calibration.

All publications and references cited herein are expressly incorporated herein by reference in their entirety.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. A method for imaging a sample, comprising:
   moving a probe in a first scanning pattern to generate a first image of the sample;
   changing a vantage point of said probe;
   moving said probe in a second scanning pattern to generate a second image of the sample; and
   reconstructing the sample by deconvolution using said first image and said second image.

2. The method for imaging a sample according to claim 1, wherein the changing a vantage point further comprises tilting said probe and said sample relative to each other.

3. The method for imaging a sample according to claim 1, wherein reconstructing the sample by deconvolution, comprises the unordered steps of:
   (a) estimating a first probe shape based on said first image to obtain a first probe estimate;
   (b) estimating a second probe shape based on said image to obtain a second probe estimate;

(c) obtaining a first sample estimate by erosion using said first probe estimate;

(d) obtaining a second sample estimate by erosion using said second probe estimate;

(e) combining the first probe shape and the second probe shape to obtain a new probe estimate;

(f) combining said first sample shape and said second sample shape to obtain a new sample estimate;

(g) obtaining a new sample first estimate by erosion using the new probe estimate;

(h) obtaining a new sample second estimate by erosion using the new probe estimate;

(i) combining new sample first estimate and the new sample second estimate to obtain a further new sample estimate;

(j) using further new sample estimate, to obtain a further new probe first estimate;

(k) using further new sample estimate, to obtain a further new probe second estimate;

(l) combining further new probe first and second estimates to obtain a still further new probe estimate; and (m) repeating steps until there is less than a predetermined threshold change in the further new sample estimate and the further new probe estimate from the previous iteration.

4. The method for imaging a sample according to claim 3, further comprising the step of generating additional images to increase image fidelity.

5. The method for imaging a sample according to claim 3, wherein estimating a first probe shape based on said first image to obtain a first probe estimate uses a blind deconvolution method; and wherein estimating a second probe shape based on said image to obtain a second probe estimate uses a blind deconvolution method.

6. The method for imaging a sample according to claim 3, wherein estimating a first probe shape based on said first image to obtain a first probe estimate uses an underscanning method; and wherein estimating a second probe shape based on said image to obtain a second probe estimate uses an underscanning method.

7. The method for imaging a sample according to claim 1, wherein the step of reconstructing the sample by deconvolution, comprises the steps of:

obtaining a Legendre transform of said first image;

obtaining a Legendre transform of said second image;

providing a parametric function to describe the probe;

providing a parametric function to describe the sample;

deriving the sample shape.

8. The method for imaging a sample according to claim 7, wherein the step of providing a parametric function to describe the probe further comprises modeling the probe to provide a probe model.

9. The method for imaging a sample according to claim 7, wherein the parametric function to describe the probe is derived from at least one of:

a conic function;

a sinusoidal function;

an exponential function; and a low order polynomial function.

10. The method for imaging a sample according to claim 7, wherein the parametric function to describe the sample is derived from at least one of:

a conic function;

a sinusoidal function;

an exponential function; and a low order polynomial function.

11. The method for imaging a sample according to claim 7, wherein the step of deriving the sample shape further comprises the steps of:

obtaining a Legendre transform of the probe;

obtaining a Legendre transform of the probe from said changed vantage point;

obtaining a Legendre transform of the sample from said changed vantage point; and obtaining a Legendre transform of the sample.

12. The method for imaging a sample according to claim 11, wherein the step of obtaining a Legendre transform of the sample further comprises the steps of:

relating the Legendre transform of the sample from said changed vantage point to the Legendre transform of said probe, said Legendre transform of said first image, said Legendre transform of said second image and said Legendre transform of the probe from said changed vantage point; and eliminating said Legendre transform of the probe and said Legendre transform of the probe from said changed vantage point from the relationship.

13. The method for imaging a sample according to claim 12, further comprising the step of using a least squares method to obtain a Legendre transform of the sample.

14. The method for imaging a sample according to claim 11, wherein the step of deriving the sample shape further comprises the step of using a reverse transform to reconstruct the sample shape.

15. The method for imaging a sample according to claim 11, further comprising the step of deriving the probe shape.

16. The method for imaging a sample according to claim 8, wherein the step of obtaining a Legendre transform of the probe further comprises calculating the Legendre transform of said probe model.

17. The method for imaging a sample according to claim 11, wherein the step of obtaining a Legendre transform of the probe further comprises the steps of:

relating the Legendre transform of the probe from said changed vantage point to said Legendre transform of the probe, said Legendre transform of said first image, said Legendre transform of said second image and said Legendre transform of the sample from said changed vantage point;

eliminating said Legendre transform of the sample and said Legendre transform of the sample from said changed vantage point from the relationship.

18. An apparatus for imaging a sample, comprising:

a probe;

a controller operative to move said probe into a first vantage point relative to the sample to produce a first image, and to move the probe into a second vantage point relative to the sample to produce a second image; and a deconvolution processor which deconvolves said first image and said second image to reconstruct the sample shape.

19. The apparatus of claim 18 wherein the deconvolution processor uses blind deconvolution and erosion to reconstruct the sample shape.

20. The apparatus of claim 18 wherein the deconvolution processor uses relationships between a set Legendre transforms of the sample, the probe and said image from a first vantage point and a set of Legendre transforms of the sample, the probe and said image from a second vantage point to reconstruct the sample shape.

21. The apparatus of claim 18 wherein the deconvolution processor further reconstructs the probe shape.

22. The apparatus of claim 18 wherein the deconvolution processor uses underscanning and erosion to reconstruct the sample shape.

* * * * *

UNITED STATES PATENT AND TRADEMARK OFFICE
CERTIFICATE OF CORRECTION

PATENT NO. : 6,661,004 B2
DATED : December 9, 2003
INVENTOR(S) : Bernardo D. Aumond et al.

It is certified that error appears in the above-identified patent and that said Letters Patent is hereby corrected as shown below:

Column 3,
Line 60, reads "Another...." and should read -- Another problem with this approach is that the shape of the probe changes over time because of physical changes in the probe due to probe wear. --.

Column 5,
Line 9, reads "images used" and should read -- images are used --.
Line 26, reads "and then by establishing" and should read -- by establishing --.

Column 6,
Line 25, reads "feed back" and should read -- feedback --.
Line 46, reads "part of" and should read -- part of a --.

Column 7,
Line 12, reads "an a central" and should read -- a central --.

Column 9,
Line 21, reads "$EstP_2 532$" and should read -- $EstP_2)\subset$ --.
Line 33, reads "In 90" and should read -- In step 90 --.
Line 55, reads "$EStS_{0new,}$" and should read -- $EstS_{0new,}$ --.
Line 55, reads "$EstS_{new,}$" and should read -- $EstS_{1new,}$ --.

Column 10,
Line 33, reads "scans of the" and should read -- scans the --.
Line 34, reads "to simulate" and should read -- simulates --.
Line 35, reads "sample. Record" and should read -- sample and records --.

Column 11,
Lines 16 and 17, reads "image 1" and should read -- image1 --.
Line 22, reads ")can" and should read -- ) can --.

Column 12,
Line 45, reads "image 2" and should read -- image2 --.

Column 13,
Lines 2 and 10, reads "$(1+m_r - m')$" and should read -- $(1+m_r \cdot m')$ --.
Line 18, reads "m'" and should read -- $m_r - m'$ --.
Line 32, reads "Ma' " and should read -- MA --.

UNITED STATES PATENT AND TRADEMARK OFFICE
CERTIFICATE OF CORRECTION

PATENT NO.   : 6,661,004 B2
DATED        : December 9, 2003
INVENTOR(S)  : Bernardo D. Aumond et al.

It is certified that error appears in the above-identified patent and that said Letters Patent is hereby corrected as shown below:

<u>Column 15,</u>
Line 6, reads "image two" and should read -- image2 --.
Line 20, reads "with out" and should read -- without --.

<u>Column 17,</u>
Lines 15 and 22, reads "combining" and should read -- combining the --.
Lines 18 and 20, reads "using" and should read -- using the --.
Line 54, reads "sample;" and should read -- sample; and --.

Signed and Sealed this

Twenty-third Day of March, 2004

JON W. DUDAS
*Acting Director of the United States Patent and Trademark Office*